(12) United States Patent
Shimizu et al.

(10) Patent No.: US 8,388,801 B2
(45) Date of Patent: Mar. 5, 2013

(54) METHOD FOR SEPARATING AN OPTICAL FILM BONDED TO AN ADHEREND WITH A PRESSURE-SENSITIVE ADHESIVE OPTICAL FILM

(75) Inventors: Takashi Shimizu, Ibaraki (JP); Toshitsugu Hosokawa, Ibaraki (JP); Masayuki Satake, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/538,041

(22) Filed: Jun. 29, 2012

(65) Prior Publication Data

US 2012/0261077 A1    Oct. 18, 2012

Related U.S. Application Data

(62) Division of application No. 11/908,888, filed as application No. PCT/JP2006/303593 on Feb. 27, 2006, now Pat. No. 8,232,361.

(30) Foreign Application Priority Data

Mar. 16, 2005 (JP) ................................. 2005-075243

(51) Int. Cl.
B32B 38/10 (2006.01)
(52) U.S. Cl. .................... 156/712; 156/701; 156/753
(58) Field of Classification Search .................... None
See application file for complete search history.

(56) References Cited

U.S. PATENT DOCUMENTS

| 3,471,435 | A | 10/1969 | Miller |
| 5,717,054 | A | 2/1998 | Schultz |
| 2001/0041763 | A1 | 11/2001 | Suzuki et al. |
| 2005/0100688 | A1 | 5/2005 | Nakano et al. |
| 2006/0008665 | A1 | 1/2006 | Kotsubo et al. |

FOREIGN PATENT DOCUMENTS

| EP | 1149884 A2 | 10/2001 |
| JP | 57-195208 A | 11/1982 |
| JP | 7-331204 A | 12/1995 |
| JP | 8-104855 A | 4/1996 |
| JP | 10-73795 A | 3/1998 |
| JP | 2001-294834 A | 10/2001 |
| JP | 2002-159955 A | 6/2002 |
| JP | 2002-249744 A | 9/2002 |
| JP | 2002-250814 A | 9/2002 |
| JP | 2004-347655 A | 12/2004 |

OTHER PUBLICATIONS

International Preliminary Report on Patentability of Corresponding International Patent Application No. PCT/JP2006/303593 mailed Sep. 27, 2007.
International Search Report of PCT/JP2006/303593, date of mailing Apr. 4, 2006.

*Primary Examiner* — Mark A Osele
*Assistant Examiner* — Nickolas Harm
(74) *Attorney, Agent, or Firm* — Westerman, Hattori, Daniels & Adrian, LLP

(57) ABSTRACT

There is provided a method for separating an optical film bonded to an adherend with a pressure-sensitive adhesive layer interposed therebetween from the adherend. The pressure-sensitive adhesive layer is formed using an optical pressure-sensitive adhesive. The optical pressure-sensitive adhesive of the invention comprises a base polymer having a functional group (F); and a coupling agent that has a benzyl ester group and is represented by Formula (1):

[Formula 1]

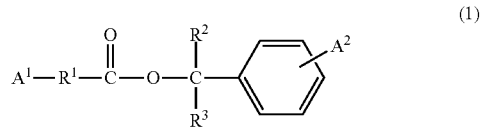

(1)

wherein $A^1$ and $A^2$ are different functional groups, one of $A^1$ and $A^2$ shows reactivity or interaction with the functional group (F) of the base polymer, $R^1$ is an optionally substituted alkylene group of 1 to 12 carbon atoms and/or an optionally substituted phenylene group, and $R^2$ and $R^3$ are each a hydrogen atom or an alkyl group of 1 to 12 carbon atoms and may be the same or different.

5 Claims, No Drawings

METHOD FOR SEPARATING AN OPTICAL FILM BONDED TO AN ADHEREND WITH A PRESSURE-SENSITIVE ADHESIVE OPTICAL FILM

CROSS-REFERENCE TO RELATED APPLICATIONS

This Application is a Division of application Ser. No. 11/908,888 filed on Sep. 17, 2007, which is a national stage of International Application No. PCT/JP2006/303593 filed on Feb. 27, 2006. Application Ser. No. 11/908,888 claims priority for Application 2005-075243 filed on Mar. 16, 2005 in Japan.

TECHNICAL FIELD

The invention relates to an optical pressure-sensitive adhesive and a pressure-sensitive adhesive optical film therewith. The optical pressure-sensitive adhesive and the pressure-sensitive adhesive optical film are suitable for use in image displays such as liquid crystal displays, organic electroluminescence displays and plasma display panels. The optical film may be a polarizing plate, a retardation plate, an optical compensation film, a brightness enhancement film, or any laminate thereof. The invention also relates to a method for separating a pressure-sensitive adhesive optical film from a liquid crystal cell substrate to which the pressure-sensitive adhesive optical film has been bonded.

BACKGROUND ART

A liquid crystal display indispensably requires polarizing elements disposed on both sides of a liquid crystal cell because of an image forming method adopted therein and generally polarizing plates are adhered. Besides, on a liquid crystal panel, various kinds of optical elements have been used in addition to a polarizing plate in order to improve a display quality of a display. For example, there have been used a retardation plate for coloration prevention, a viewing angle increasing film for improving a viewing angle of a liquid crystal display and a brightness enhancement film for raising a contrast of a display. The films each are collectively referred to an optical film.

A pressure-sensitive adhesive is usually employed in adhering an optical film described above to a liquid crystal cell. An optical film and a liquid crystal cell or optical films are usually adhered to each other using a pressure-sensitive adhesive therebetween in order to reduce a light loss. In such cases, a pressure-sensitive adhesive optical film in which a pressure-sensitive adhesive is provided in advance on one surface of an optical film as a pressure-sensitive adhesive layer is generally used because of a merit such as that no necessity arises for a drying step of fix the optical film.

Necessary features required for the pressure-sensitive adhesive are that (1) even when the process of bonding an optical film to a liquid crystal panel surface is performed in a wrong position or accompanied by a foreign substance trapped on the bonded surface, the optical film can be separated from the liquid crystal panel surface and bonded again (reworked); (2) the pressure-sensitive adhesive has stress relaxation properties in order to prevent optical unevenness which would otherwise be caused by a dimensional change of the optical film; (3) defects responsible for the pressure-sensitive adhesive do not occur in an endurance test by heating, humidifying or the like generally performed as an accelerated environment test; and so on.

However, there is a problem in which the release forces of the pressure-sensitive adhesive increases with time so that it can be very difficult to separate the optical film from the adherend at the time of reworking or at the time of separating and collecting the liquid crystal panel. Particularly when the pressure-sensitive adhesive used has improved durability, the separation of the optical film should be difficult.

In order to solve the above problem with release property, it is proposed to bond an optical film to glass through a weak pressure-sensitive adhesive layer with low adhesive strength (see Patent Literature 1 below). However, this technique has a problem with the durability of the pressure-sensitive adhesive layer. There is also proposed a separation method in which when a polarizing plate is separated from the surface of a liquid crystal cell, the temperature of the polarizing plate is lowered (see Patent Literature 2 below). However, this method has a problem in which operational efficiency is lowered. There is also proposed a method that includes cutting a polarizing plate while leaving it attached to the surface of a liquid crystal panel, attaching the cut pieces of the polarizing plate to a pressure-sensitive adhesive tape and separating them from the panel (see Patent Literature 3 below). However, this method has a problem in which the liquid crystal panel can be damaged.

In contrast, the optical film bonded to the liquid crystal panel with the pressure-sensitive adhesive interposed therebetween can easily release at high humidity. In order to improve durability in a humidified environment and the like, therefore, a coupling agent is generally added to an optical pressure-sensitive adhesive (see Patent Literatures 4 and 5 below). Such a pressure-sensitive adhesive can prevent the separation of the optical film in a humidified environment but accordingly has higher adhesive strength to make releasing difficult at the time of separation and collection.

Patent Literature 1: JP-A No. 2004-347655
Patent Literature 2: JP-A No. 10-73795
Patent Literature 3: JP-A No. 2002-159955
Patent Literature 4: JP-A No. 57-195208
Patent Literature 5: JP-A No. 08-104855

DISCLOSURE OF INVENTION

Objects to be Achieved by the Invention

It is an object of the invention to provide an optical pressure-sensitive adhesive for use in pressure-sensitive adhesive optical films and so on that offers high performance in terms of both durability and release property.

It is another object of the invention to provide a pressure-sensitive adhesive optical film using the optical pressure-sensitive adhesive. It is yet another object of the invention to provide an image display using the pressure-sensitive adhesive optical film.

It is still another object of the invention to provide a method for easily separating an optical film from an adherend such as a liquid crystal cell substrate, to which the optical film has been attached through a pressure-sensitive adhesive layer formed with the optical pressure-sensitive adhesive.

Means for Solving the Problems

The inventors have been conducted serious studies in order to solve the problems and as a result, they found the optical pressure-sensitive adhesive described below, which has led to completion of the invention.

Thus, the invention relates to an optical pressure-sensitive adhesive, comprising:

a base polymer having a functional group (F); and
a coupling agent that has a benzyl ester group and is represented by Formula (1):

[Formula 1]

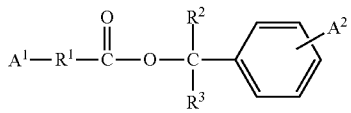
(1)

wherein $A^1$ and $A^2$ are different functional groups, one of $A^1$ and $A^2$ shows reactivity or interaction with the functional group (F) of the base polymer, $R^1$ is an optionally substituted alkylene group of 1 to 12 carbon atoms and/or an optionally substituted phenylene group, and $R^2$ and $R^3$ are each a hydrogen atom or an alkyl group of 1 to 12 carbon atoms and may be the same or different.

In the optical pressure-sensitive adhesive, the coupling agent represented by Formula (2) is preferably used.

[Formula 2]

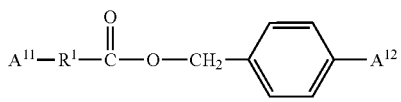
(2)

wherein $A^{11}$ is an alkoxysilyl group, a hydroxyl group, a carboxyl group, or an isocyanate group, $A^{12}$ is an epoxy group or a glycidyl group, and $R^1$ is an optionally substituted alkylene group of 1 to 12 carbon atoms and/or an optionally substituted phenylene group.

In the optical pressure-sensitive adhesive, the base polymer is preferably an acrylic polymer comprising an alkyl(meth) acrylate as a main monomer unit.

In the optical pressure-sensitive adhesive, various kinds of the functional group (F) of the base polymer are used, but a hydroxyl group is preferable.

The optical pressure-sensitive adhesive preferably comprises 100 parts by weight of the base polymer and 0.001 to 10 parts by weight of the coupling agent.

In the optical pressure-sensitive adhesive, preferably further comprises a crosslinking agent.

The invention also relates to a pressure-sensitive adhesive optical film, comprising:
an optical film; and
a pressure-sensitive adhesive layer laminated on at least one side of the optical film, wherein the pressure-sensitive adhesive layer is formed using the above optical pressure-sensitive adhesive.

The invention also relates to an image display, comprising the above pressure-sensitive adhesive optical film.

The invention also relates to a method for separating an optical film bonded to an adherend with a pressure-sensitive adhesive layer interposed therebetween from the adherend, comprising:
irradiating the pressure-sensitive adhesive layer with ionizing radiation; and
then separating the optical film from the adherend, wherein the pressure-sensitive adhesive layer is formed using the above optical pressure-sensitive adhesive.

Effects of the Invention

The optical pressure-sensitive adhesive of the invention includes a base polymer and a coupling agent having a benzyl ester group. Thus, the optical pressure-sensitive adhesive of the invention has good durability because of the action of the coupling agent, and when an optical film is attached with the pressure-sensitive adhesive to an adherend such as a liquid crystal cell substrate, the optical film can be prevented from releasing even in a humidified environment.

In the benzyl ester group of the coupling agent, the ester bond can be cleaved by ionizing irradiation. For example, the formula below represents a case where benzyl propionate is irradiated with ionizing radiation.

[Formula 5]

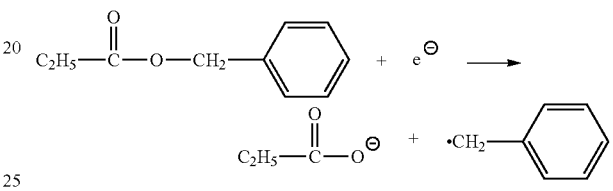

When an optical film is attached to an adherend such as a liquid crystal cell substrate through a pressure-sensitive adhesive layer formed with the optical pressure-sensitive adhesive of the invention and when the used liquid crystal panel is separated into parts to be collected, the ester bond of the benzyl ester group may be cleaved by ionizing irradiation as described above so that a reduction in the adhesive strength of the pressure-sensitive adhesive layer can be achieved to facilitate the separation of the optical film from the adherend. Thus, the optical film can be easily separated and collected from the liquid crystal panel without damaging the liquid crystal cell.

BEST MODE FOR CARRYING OUT THE INVENTION

The optical pressure-sensitive adhesive of the invention includes a base polymer having a functional group (F). The functional group (F) is reactive with the functional group ($A^1$) or ($A^2$) of the coupling agent represented by Formula (1). Examples of the functional group (F) include a hydroxyl group, a carboxyl group, an isocyanate group, an epoxy group, and a glycidyl group. Among these functional groups (F), the hydroxyl group is preferred in view of reactivity or interaction with the coupling agent, easiness of introduction into the base polymer, and reactivity with crosslinking agents.

Any base polymer having the functional group (F) may be used without limitation. For example, the base polymer to be used may be appropriately selected from acrylic polymers, silicone polymers, polyesters, polyurethanes, polyamides, polyethers, fluoropolymers, and rubber polymers. In particular, acrylic polymers are preferably used, because they exhibit good optical transparency and appropriate wettability, cohesiveness and pressure-sensitive adhesive properties.

Acrylic polymers may include alkyl(meth)acrylate as a main monomer unit. The term "(meth)acrylate" refers to acrylate and/or methacrylate, and "(meth)" has the same meaning with respect to the invention. The alkyl group of the alkyl(meth)acrylate constituting the main skeleton of acrylic polymers may have an average number of carbon atoms of about 1 to about 12. Examples of the alkyl(meth)acrylate may include methyl(meth)arylate, ethyl(meth)acrylate, n-butyl (meth)acrylate, 2-ethylhexyl(meth)acrylate, isooctyl(meth)acrylate, isononyl(meth)acrylate, and lauryl(meth)acrylate, and these may be used either singly or in combination. Above all, $C_4$ to $C_{12}$ alkyl(meth)acrylate is preferred.

The functional group (F) is introduced into the acrylic polymers. While there is no limitation to the introduction of the functional group (F), the functional group (F) may be typically introduced by copolymerization of a monomer or monomers having the functional group (F).

The content of the copolymerized monomer having the functional group (F) in an acrylic polymer is preferably, but not limited to, from about 0.01 to 10% by weight, more preferably from 0.03 to 5% by weight, still more preferably from 0.05 to 2% by weight, based on the total weight of all the monomer units of the acrylic polymer.

Examples of hydroxyl group-containing monomers include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 10-hydroxydecyl(meth)acrylate, 12-hydroxylauryl(meth)acrylate, and (4-hydroxymethylcyclohexyl)-methyl acrylate.

Examples of carboxyl group-containing monomers include (meth)acrylic acid, carboxyethyl(meth)acrylate, carboxypentyl(meth)acrylate, itaconic acid, maleic acid, fumaric acid, and crotonic acid.

Examples of other copolymerizable monomers include acid anhydride group-containing monomers such as maleic anhydride and itaconic anhydride; caprolactone addition products of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid; and phosphate group-containing monomers such as 2-hydroxyethylacryloyl phosphate.

Nitrogen-containing vinyl monomers may also be used. Examples of such monomers for modification include maleimide, N-cyclohexylmaleimide, N-phenylmaleimide; N-acryloylmorpholine; (N-substituted) amide monomers such as (meth)acrylamide, N,N-dimethyl(meth)acrylamide, N,N-diethyl(meth)acrylamide, N-hexyl(meth)acrylamide, N-methyl(meth)acrylamide, N-butyl(meth)acrylamide, N-butyl(meth)acrylamide, N-methylol(meth)acrylamide, and N-methylolpropane(meth)acrylamide; alkylaminoalkyl(meth)acrylate monomers such as aminoethyl(meth)acrylate, aminopropyl(meth)acrylate, N,N-dimethylaminoethyl(meth)acrylate, tert-butylaminoethyl(meth)acrylate, and 3-(3-pyrimidyl)propyl(meth)acrylate; alkoxyalkyl(meth)acrylate monomers such as methoxyethyl(meth)acrylate and ethoxyethyl(meth)acrylate; and succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, and N-acryloylmorpholine.

It is also possible to use vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers such as acrylonitrile and methacrylonitrile; epoxy group-containing acrylic monomers such as glycidyl(meth)acrylate; glycol acrylate monomers such as polyethylene glycol(meth)acrylate, polypropylene glycol(meth)acrylate, methoxyethylene glycol(meth)acrylate, and methoxypolypropylene glycol(meth)acrylate; and acrylate ester monomers such as tetrahydrofurfuryl(meth)acrylate, fluoro(meth)acrylate, silicone(meth)acrylate, and 2-methoxyethyl acrylate.

Suitable copolymerizable monomers having at least the functional group (F) may be selected depending on the functional group of the coupling agent. A copolymerizable monomer or monomers other than the functional group (F)-containing copolymerizable monomer may also be used. Even in such a case, the total content of all the copolymerized monomers in the acrylic polymer is preferably controlled to be about 30% by weight or less, based on the total weight of all the monomer units of the acrylic polymer.

Average molecular weight of the acrylic polymer is not limited, but the weight average molecular weight of about 500,000 to 2,500,000 is preferable. The (meth)acrylic-based polymer may be produced by a variety of known methods, for example, by a method appropriately selected from radical polymerization methods including a bulk polymerization method, a solution polymerization method and a suspension polymerization method. A variety of known radical polymerization initiators may be used such as azo initiators and peroxide initiators. The reaction is generally performed at a temperature of about 50° C. to about 80° C. for a time period of 1 to 8 hours. Among the above methods, the solution polymerization method is particularly preferred, and ethyl acetate, toluene, or the like is generally used as an acrylic polymer solvent. The concentration of the solution is generally from about 20 to 80% by weight.

Examples of the base polymer for the rubber pressure-sensitive adhesive include natural rubbers, isoprene rubbers, styrene-butadiene rubbers, reclaimed rubbers, polyisobutylene rubbers, styrene-isoprene-styrene rubbers, and styrene-butadiene-styrene rubbers. Examples of the base polymer for the silicone pressure-sensitive adhesive include dimethylpolysiloxane, diphenylpolysiloxane, and the like. These base polymers to be used also have an introduced functional group (F) such as a hydroxyl group and a carboxyl group.

The optical pressure-sensitive adhesive of the invention comprises a coupling agent having a benzyl ester group and being represented by Formula (1) described below, in addition to the base polymer having a functional group (F).

[Formula 1]

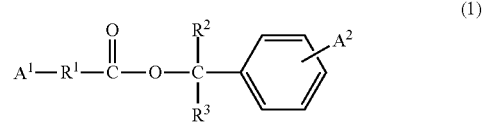

(1)

wherein $A^1$ and $A^2$ are different functional groups, one of $A^1$ and $A^2$ shows reactivity or interaction with the functional group (F) of the base polymer, $R^1$ is an optionally substituted alkylene group of 1 to 12 carbon atoms and/or an optionally substituted phenylene group, and $R^2$ and $R^3$ are each a hydrogen atom or an alkyl group of 1 to 12 carbon atoms and may be the same or different.

In the coupling agent represented by Formula (1), one of the functional groups ($A^1$) and ($A^2$) shows reactivity or interaction with the functional group (F) of the base polymer, and the other functional group may show reactivity or interaction with the adherend such as a glass surface. The functional groups ($A^1$) and ($A^2$) used are different from each other and thus may act on the base polymer of the pressure-sensitive adhesive and the adherend, respectively, or vice versa, to enhance the adhesive strength. Concerning the functional groups, "reactivity" refers to the abilities to cause a reaction between functional groups and to form a chemical bond, and "interaction" refers to a certain action by hydrogen bonding, coordinate bonding, or the like.

Examples of the functional group ($A^1$) or ($A^2$) reactive with the functional group (F) include an alkoxysilyl group (—Si(OR)$_3$, wherein R is an alkyl group of 1 to 4 carbon atoms), a hydroxyl group, a carboxyl group, an isocyanate group, an epoxy group, a glycidyl group, and an amino group.

The benzyl ester group is preferably of a benzyl ester group-containing compound derived from benzyl acetate, benzyl propionate, benzyl butyrate, benzyl valerate, benzyl benzoate, or the like.

The coupling agent represented by Formula (1) may be appropriately selected in view of the type of the functional group (F) of the base polymer, the type of the adherend and so on, and, for example, may include a compound represented by Formula (2):

[Formula 2]

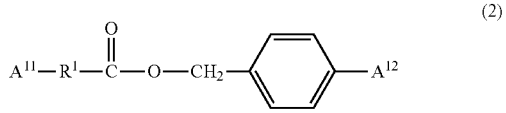

(2)

wherein $A^{11}$ is an alkoxysilyl group, a hydroxyl group, a carboxyl group, or an isocyanate group, $A^{12}$ is an epoxy group or a glycidyl group, and $R^1$ is an optionally substituted alkylene group of 1 to 12 carbon atoms and/or an optionally substituted phenylene group.

In the coupling agent represented by Formula (2), the functional group ($A^{11}$) can show favorable reactivity or interaction with the adherend and is particularly preferred in cases where the adherend is glass. In particular, the functional group ($A^{11}$) is preferably an alkoxysilyl group.

On the other hand, the functional group ($A^{12}$) can show favorable reactivity or interaction with the functional group (F) of the base polymer. For example, when the functional group (F) is hydroxyl group, the functional group ($A^{12}$) is preferably an epoxy group, a glycidyl group, a carboxyl group, or an isocyanate group, particularly preferably an epoxy group. For example, when the functional group (F) is carboxyl group, the functional group ($A^{12}$) is preferably an epoxy group, a glycidyl group, a hydroxyl group, or an isocyanate group, particularly preferably an epoxy group.

In particular, the coupling agent represented by Formula (2) is preferably a silane coupling agent in which the functional group ($A^{11}$) is an alkoxysilyl group, and the functional group ($A^{12}$) is an epoxy group.

The amount of the coupling agent used in the invention is preferably in the range of about 0.001 to about 10 parts by weight, more preferably in the range of 0.05 to 5 parts by weight, based on 100 parts by weight of the base polymer. If the amount of use of the coupling agent is less than 0.001 parts by weight, releasing can tend to occur at the interface between the pressure-sensitive adhesive and the adherend such as glass in a humidified environment. If the amount of use of the coupling agent is more than 10 parts by weight, the pressure-sensitive adhesive can tend to have a problem with function.

The optical pressure-sensitive adhesive of the invention preferably further includes a crosslinking agent. The crosslinking agent can improve adhesion to optical films or durability and can achieve high temperature reliability or preserve the shape of the pressure-sensitive adhesive itself at high temperature. Any appropriate crosslinking agent may be used, such as an isocyanate, peroxide, epoxy, metal chelate, or oxazoline crosslinking agent. When the functional group (F) of the base polymer is hydroxyl group, a crosslinking agent having a functional group reactive with hydroxyl group is preferred, and an isocyanate crosslinking agent is particularly preferred.

An isocyanate-based crosslinking agent contains an isocyanate compound. Examples of the isocyanate compounds include: isocyanate monomers such as tolylene diisocyanate; chlorophenylene diisocyanate, hexamethylene diisocyanate, tetramethylene diisocyanate, isophorone diisocyanate; xylylene diisocyanate, diphenylmethane diisocyanate, hydrogenated diphenylmethane diisocyanate, and adduct type isocyanate compounds obtained by adding the isocyanate monomer to a polyhydroxy alcohol, for example trimethylolpropane; and urehthane prepolymer type isocyanates obtained by addition reaction of an isocyanurate compound, a burette type compound, in addition thereto a known polyether polyol, a known polyester polyol, a acryl polyol, a polybutadiene polyol, a polyisoprene polyol and the like.

While the base polymer such as the acrylic polymer and the crosslinking agent may be blended in any ratio, 100 parts by weight of the base polymer (solid) is generally blended with about 10 parts by weight or less, preferably about 0.01 to about 10 parts by weight, more preferably about 0.1 to about 5 parts by weight of the crosslinking agent (solid).

If necessary, the optical pressure-sensitive adhesive of the present invention may conveniently contain various types of additives such as tackifiers, plasticizers, fillers such as glass fibers, glass beads, metal power, or any other inorganic powder, pigments, colorants, antioxidants, ultraviolet absorbers, and silane-coupling agents, without departing from the object of the invention. The pressure-sensitive adhesive layer may also contain fine particles so as to have light diffusion properties.

The pressure-sensitive adhesive layer may be formed by laminating it on the binder polymer layer. It may be formed by any method such as a method including applying a pressure-sensitive adhesive solution to the binder polymer layer and drying it or a method including the steps of forming the pressure-sensitive adhesive layer on a release sheet and transferring it from the release sheet. The thickness of the pressure-sensitive adhesive layer is preferably, but not limited to, from about 10 to 40 μm.

Examples of constituent materials of a release sheet include: proper thin items such as paper; synthetic resin films made of polyethylene, polypropylene, polyethylene terephthalate; a rubber sheet, paper, cloth, unwoven fabric, net, a foam sheet and a metal foil, and a laminate thereof. In order to enhance releasability from a pressure-sensitive adhesive layer, a release treatment imparting a low adherence, such as a silicone treatment, a long chain alkylation treatment or a fluorination treatment, may be applied onto a surface of a release sheet when required.

The pressure-sensitive adhesive optical film of the invention includes an optical film and a pressure-sensitive adhesive layer that is formed with the optical pressure-sensitive adhesive on at least one side of the optical film. The pressure-sensitive adhesive layer may be provided on one or both sides of the optical film.

No specific limitation is placed on a formation method for a pressure-sensitive adhesive layer and the following methods can be used: one of which is a method in which a pressure-sensitive adhesive solution is coated on an optical film and the film is dried and another of which is a method in which a pressure-sensitive adhesive layer is transferred with a release sheet on which the pressure-sensitive adhesive layer is formed. Coating methods that can be adopted are roll coating methods such as a reverse coating method and a gravure coating method, a spin coating method, a screen coating method, a fountain coating method, a dipping method, a spray method and the like. No specific limitation is placed on a thickness of a pressure-sensitive adhesive layer, whereas a thickness thereof is preferably in the range of about 10 to 40 µm. After the pressure-sensitive adhesive solution is applied, the solvent or water may be evaporated by a drying process so that a pressure-sensitive adhesive layer with a desired thickness can be obtained.

The thickness of the pressure-sensitive adhesive layer may be appropriately determined depending on the application purpose, the adhesive strength or the like and is generally from 1 to 40 µm, preferably from 5 to 30 µm, particularly preferably from 10 to 25 µm. A thickness of less than 1 µm can lead to poor durability. If the thickness is more than 40 µm, separation or releasing can be easily caused by foaming or the like so that a poor appearance can be easily produced. The pressure-sensitive adhesive layer may be a laminate of layers different in composition, type or the like and formed on one or both sides of a polarizing plate or an optical film. The pressure-sensitive adhesive layers formed on both sides may be different in composition, type or thickness between the front and back sides of a polarizing plate or an optical film.

The pressure-sensitive adhesive layer may also be formed by applying UV-curable pressure-sensitive adhesive syrup onto a release film and irradiating the syrup with UV. The pressure-sensitive adhesive layer may be crosslinked by the UV irradiation. In this case, the pressure-sensitive adhesive may contain a crosslinkable monomer so that reliability or retention of the shape of the pressure-sensitive adhesive itself can be achieved at high temperature. In this case, the pressure-sensitive adhesive may also contain crosslinking agents such as the isocyanate crosslinking agent.

The pressure-sensitive adhesive layer may be crosslinked in the drying or UV irradiation process. Alternatively, another crosslinking mode may also be chosen, in which aging by warming or standing at room temperature is performed so as to facilitate crosslinking after the drying.

In the process of forming the pressure-sensitive adhesive layer and the like, the optical film may be subjected to an activation process for improving interlayer adhesion. Various methods may be used for the activation process, and specifically, surface treatment such as corona discharge treatment, plasma discharge treatment, glow discharge treatment, and low-pressure UV treatment, or saponification may be performed.

In addition, in the present invention, ultraviolet absorbing property may be given to the above-mentioned each layer of the adhesive optical film of the invention, such as the optical film, and the adhesive layer etc., using a method of adding UV absorbents, such as salicylic acid ester type compounds, benzophenol type compounds, benzotriazol type compounds, cyano acrylate type compounds, and nickel complex salt type compounds.

In order to impart antistatic properties to the pressure-sensitive adhesive optical film, an antistatic agent may also be used. The antistatic agent may be added to each layer, or alternatively, an antistatic layer may be independently formed. Examples of the antistatic agent include ionic surfactants; electrically-conductive polymers such as polyaniline, polythiophene, polypyrrole, and polyquinoxaline; and metal oxides such as tin oxide, antimony oxide and indium oxide. In particular, electrically-conductive polymers are preferably used, in view of optical properties, appearance, antistatic effect, and stability of the antistatic effect during heating or humidifying. In particular, a water-soluble or dispersible electrically-conductive polymer such as polyaniline and polythiophene is preferably used, because when the water-soluble or dispersible electrically-conductive polymer is used as an antistatic layer-forming material in the coating process, an optical film substrate can be prevented from deteriorating due to an organic solvent.

The optical pressure-sensitive adhesive of the invention may be used to form a pressure-sensitive adhesive layer and to bond an optical film to an adherend with the pressure-sensitive adhesive layer interpose therebetween. As described above, the optical pressure-sensitive adhesive may be used to form a pressure-sensitive adhesive optical film, which includes an optical film and a pressure-sensitive adhesive layer laminated thereon. The optical film bonded to the adherend with the pressure-sensitive adhesive layer interposed therebetween can be easily separated from the adherend after the pressure-sensitive adhesive layer is irradiated with ionizing radiation. The ester bond of the benzyl ester group is cleaved by the ionizing radiation so that the adhesive strength of the pressure-sensitive adhesive layer is reduced. For example, the adherend may be, but not limited to, a glass surface of a liquid crystal cell or the like.

The ionizing radiation may be of any type, as long as it can cleave the ester bond of the benzyl ester group. Examples thereof include α-rays, β-rays, γ-rays, X-rays, vacuum ultraviolet radiation, electron beams, and ion beams. In particular, γ-rays and electron beams are preferred.

The dose of the absorbed ionizing radiation is preferably in the range of 0.1 to 1000 kGy, more preferably in the range of 1 to 500 kGy. If the absorbed radiation dose is less than 0.1 kGy, the ester bond of the benzyl ester group can be poorly cleaved so that the adhesive strength can be less changed. If the absorbed radiation dose is more than 1000 kGy, the adherend such as a liquid crystal cell can be damaged by the ionizing radiation. When an electron beam is used as the ionizing radiation, it is preferably applied in a nitrogen atmosphere.

The optical film for use in the pressure-sensitive adhesive optical film of the invention may be any type of film that has been used to form image displays such as liquid crystal displays. For example, the optical film serves as a polarizing plate. A polarizing plate comprising a polarizer and a transparent protective film provided on one side or both sides of the polarizer is generally used.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As a materials forming the transparent protective film prepared on one side or both sides of the above-mentioned polarizer, with outstanding transparency, mechanical strength, heat stability, moisture cover property, isotropy, etc. may be preferable. For example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. The transparent protective film can be formed as a cured layer made of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protective film, which can be determined arbitrarily, is 1 to 500 μm, especially 5 to 200 μm in viewpoint of strength, work handling and thin layer.

The protective film is preferably as colorless as possible. Thus, a protective film is preferably used which has a film-thickness-direction retardation of −90 nm to +75 nm, wherein the retardation (Rth) is represented by the formula: Rth= [(nx+ny)/(2−nz)]d, wherein nx and ny are each a principal refractive index in the plane of the film, nz is a refractive index in the film-thickness direction, and d is the thickness of the film. If a protective film with such a thickness-direction retardation value (Rth) of −90 nm to +75 nm is used, coloring (optical coloring) of the polarizing plate can be almost avoided, which could otherwise be caused by any other protective film. The thickness-direction retardation (Rth) is more preferably from −80 nm to +60 nm, particularly preferably from −70 nm to +45 nm.

As the protective film, if polarization property and durability are taken into consideration, cellulose based polymer, such as triacetyl cellulose, is preferable, and especially triacetyl cellulose film is suitable. Thermoplastic saturated norbornene resins may also be used, which do not easily have retardation even when stress is applied thereto due to a dimensional change of a polarizer. The thermoplastic saturated norbornene resins have a cycloolefin main skeleton and do not substantially have a carbon-carbon double bond. Examples of the thermoplastic saturated norbornene resins include Zeonex and Zeonor series manufactured by Zeon Corporation and Arton series manufactured by JSR Corporation.

In addition, when the protective films are provided on both sides of the polarizer, the protective films comprising same polymer material may be used on both of a front side and a back side, and the protective films comprising different polymer materials etc. may be used.

The polarizer and the protective film are bonded with an aqueous adhesive. The aqueous adhesive includes isocyanate based adhesives, polyvinyl alcohol based adhesives, gelatin based adhesives, vinyl based latex based, aqueous polyester based adhesives, and the likes.

As the opposite side of the polarizing-adhering surface above-mentioned transparent protective film, a film with a hard coat layer and various processing aiming for antireflection, sticking prevention and diffusion or anti glare may be used.

A hard coat processing is applied for the purpose of protecting the surface of the polarization plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarization plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarization plate to disturb visual recognition of transmitting light through the polarization plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarization plate and expanding a viewing angle etc.

In addition, the above-mentioned antireflection layer, sticking prevention layer, diffusion layer, anti glare layer, etc.

may be built in the protective film itself, and also they may be prepared as an optical layer different from the protective film.

Further an optical film of the invention may be used as other optical layers, such as a reflective plate, a transflective plate, a retardation plate (a half wavelength plate and a quarter wavelength plate included), and a viewing angle compensation film, which may be used for formation of a liquid crystal display etc. These are used in practice as an optical film, or as one layer or two layers or more of optical layers laminated with polarizing plate.

Especially preferable polarizing plates are; a reflection type polarization plate or a transflective type polarization plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarization plate in which a viewing angle compensation film is further laminated onto the polarizing plate; or a polarizing plate in which a brightness enhancement film is further laminated onto the polarizing plate.

A reflective layer is prepared on a polarization plate to give a reflection type polarization plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarization plate may be formed using suitable methods, such as a method in which a reflective layer of metal etc. is, if required, attached to one side of a polarization plate through a transparent protective layer etc.

As an example of a reflection type polarization plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarization plate, a reflection plate may also be used as a reflective sheet constituted by preparing a reflective layer on the suitable film for the transparent film. In addition, since a reflective layer is usually made of metal, it is desirable that the reflective side is covered with a protective film or a polarization plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarization plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarization plate. That is, the transflective type polarization plate is useful to obtain of a liquid crystal display of the type that saves energy of light sources, such as a back light, in a well-lighted atmosphere, and can be used with a built-in light source if needed in a comparatively dark atmosphere etc.

A description of the above-mentioned elliptically polarization plate or circularly polarization plate on which the retardation plate is laminated to the polarization plates will be made in the following paragraph. These polarization plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarization plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarization plate in which three-dimensional refractive index is controlled may also preferably compensate (prevent) coloring produced when a screen of a liquid crystal display is viewed from an oblique direction. Circularly polarization plate is effectively used, for example, when adjusting a color tone of a picture of a reflection type liquid crystal display that provides a colored picture, and it also has function of antireflection.

As retardation plates, birefringence films obtained by uniaxial or biaxial stretching polymer materials, oriented films of liquid crystal polymers, and materials in which orientated layers of liquid crystal polymers are supported with films may be mentioned. Although a thickness of a retardation plate also is not especially limited, it is in general approximately from 0.5 to 150 μm, further 0.5 to 50 μm.

As polymer materials, for example, polyvinyl alcohols, polyvinyl butyrals, polymethyl vinyl ethers, poly hydroxyethyl acrylates, hydroxyethyl celluloses, hydroxypropyl celluloses, methyl celluloses, polycarbonates, polyarylates, polysulfones, polyethylene terephthalates, polyethylene naphthalates, polyethersulfones, polyphenylene sulfides, polyphenylene oxides, polyallyl sulfones, polyvinyl alcohols, polyamides, polyimides, polyolefins, polyvinyl chlorides, cellulose type polymers, or bipolymers, terpolymers, graft copolymers, blended materials of the above-mentioned polymers may be mentioned. These polymer raw materials make oriented materials (stretched film) using a stretching process and the like.

As liquid crystalline polymers, for example, various kinds of polymers of principal chain type and side chain type in which conjugated linear atomic groups (mesogens) demonstrating liquid crystalline orientation are introduced into a principal chain and a side chain may be mentioned. As examples of principal chain type liquid crystalline polymers, polymers having a structure where mesogen groups are combined by spacer parts demonstrating flexibility, for example, polyester based liquid crystalline polymers of nematic orientation property, discotic polymers, cholesteric polymers, etc. may be mentioned. As examples of side chain type liquid crystalline polymers, polymers having polysiloxanes, polyacrylates, polymethacrylates, or polymalonates as a principal chain structure, and polymers having mesogen parts comprising para-substituted ring compound units providing nematic orientation property as side chains via spacer parts comprising conjugated atomic groups may be mentioned. These liquid crystalline polymers, for example, is obtained by spreading a solution of a liquid crystal polymer on an orientation treated surface where rubbing treatment was performed to a surface of thin films, such as polyimide and polyvinyl alcohol, formed on a glass plate and or where silicon oxide was deposited by an oblique evaporation method, and then by heat-treating.

A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarization plate and an above-mentioned reflected type elliptically polarization plate are laminated plate combining suitably a polarization plate or a reflection type polarization plate with a retardation plate. This type of elliptically polarization plate etc. may be manufactured by combining a polarization plate (reflected type) and a retardation plate, and by laminating them one by one separately in the manufacture process of a liquid crystal display. On the other hand, the polarization plate in which lamination was beforehand carried out and was obtained as an optical film, such as an elliptically polarization plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal bidirectional stretching and a biaxially stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarization plate with which a polarization plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarization plate, which is obtained by laminating a brightness enhancement film to a polarization plate, thus does not transmit light without the predetermined polarization state and reflects it, while obtaining transmitted light with the predetermined polarization state by accepting a light from light sources, such as a backlight. This polarization plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarization plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarization plate as it is, the absorption loss by the polarization plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarization plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarization plate may consist of multi-layered film of laminated layers of a polarization plate and two of more of optical layers as the above-mentioned separated type polarization plate. Therefore, a polarization plate may be a reflection type elliptically polarization plate or a semi-transmission type elliptically polarization plate, etc. in which the above-mentioned reflection type polarization plate or a transflective type polarization plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

The pressure-sensitive adhesive optical film of the invention is preferably used to form various types of image displays such as liquid crystal displays. Liquid crystal displays may be formed according to conventional techniques. Specifically, liquid crystal displays are generally formed by appropriately assembling a liquid crystal cell and the pressure-sensitive adhesive optical film and optionally other components such as a lighting system and incorporating a driving circuit according to any conventional technique, except that the pressure-sensitive adhesive optical film of the invention is used. Any type of liquid crystal cell may also be used such as a TN type, an STN type and a π type.

Suitable liquid crystal displays, such as liquid crystal display with which the above pressure-sensitive adhesive optical film has been located at one side or both sides of the liquid crystal cell, and with which a backlight or a reflective plate is used for a lighting system may be manufactured. In this case, the optical film by the invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

EXAMPLES

While concrete description will be given of the invention using examples below, the invention is not limited to the examples. Note that the term "part or parts" and "%" should read "part or parts by weight" and "wt %".

(Preparation of Optical Film)

An 80 μm-thick polyvinyl alcohol film was stretched to a stretch ratio of 5 in an aqueous iodine solution at 40° C. and then dried at 50° C. for 4 minutes to give a polarizer. A 40 μm-thick triacetylcellulose film was bonded with a polyvinyl alcohol adhesive to both sides of the resulting polarizer so that a polarizing plate was obtained.

Example 1

Coupling Agent (1) Having Benzyl Ester Group

The coupling agent having the following structure was used.

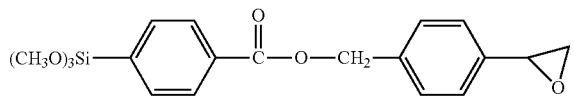

[Formula 8]

(Preparation of Pressure-Sensitive Adhesive and Pressure-Sensitive Adhesive Layer)

A solution (with a solid content of 15%) was used that contained, as a base polymer, an acrylic polymer with a weight average molecular weight of 1,300,000 comprising a copolymer of butyl acrylate and hydroxybutyl acrylate (99:1 in weight ratio). Based on 100 parts by weight of the solid of the polymer, 1.33 parts by weight of Coronate L (manufactured by Nippon Polyurethane Industry Co., Ltd.), 0.5 parts by weight of Coupling Agent (1) and a solvent (toluene) for adjusting viscosity were added to the acrylic polymer solution so that a pressure-sensitive adhesive solution (with a solid content of 10%) was prepared. The pressure-sensitive adhesive solution was applied to a release film (a polyethylene terephthalate substrate, Diafoil MRF38 manufactured by Mitsubishi Chemical Polyester Co., Ltd.) such that the coating would have a post-drying thickness of 20 μm, and then the coating was dried in a circulating hot air oven to form a pressure-sensitive adhesive layer.

(Preparation of Pressure-Sensitive Adhesive Optical Film)

The release film with the pressure-sensitive adhesive layer formed thereon was bonded to the surface of the polarizing plate so that a pressure-sensitive adhesive polarizing plate was prepared.

Example 2

Coupling Agent (2) Having Benzyl Ester Group

The coupling agent having the following structure was used.

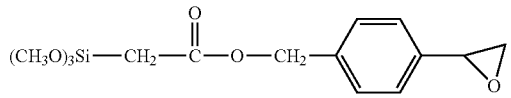

[Formula 9]

(Preparation of Pressure-Sensitive Adhesive and Pressure-Sensitive Adhesive Layer)

A pressure-sensitive adhesive solution was prepared using the process of Example 1, except that Coupling Agent (2) was used in place of Coupling Agent (1). A pressure-sensitive adhesive layer was then formed using the process of Example 1.

(Preparation of Pressure-Sensitive Adhesive Optical Film)

The release film with the pressure-sensitive adhesive layer formed thereon was bonded to the surface of the polarizing plate so that a pressure-sensitive adhesive polarizing plate was prepared.

Comparative Example 1

Preparation of Pressure-Sensitive Adhesive and Pressure-Sensitive Adhesive Layer A pressure-sensitive adhesive solution was prepared using the process of Example 1, except that a silane coupling agent (KBM403 manufactured by Shin-Etsu Silicone Co., Ltd.) was used in place of Coupling Agent (1). The silane coupling agent (KBM403 manufactured by Shin-Etsu Silicone Co., Ltd.) has no benzyl ester group. A pressure-sensitive adhesive layer was then formed using the process of Example 1.

(Preparation of Pressure-Sensitive Adhesive Optical Film)

The release film with the pressure-sensitive adhesive layer formed thereon was bonded to the surface of the polarizing plate so that a pressure-sensitive adhesive polarizing plate was prepared.

(Preparation of Pressure-Sensitive Adhesive and Pressure-Sensitive Adhesive Layer)

A pressure-sensitive adhesive solution was prepared using the process of Example 1, except that Coupling Agent (1) was not used. A pressure-sensitive adhesive layer was then formed using the process of Example 1.

(Preparation of Pressure-Sensitive Adhesive Optical Film)

The release film with the pressure-sensitive adhesive layer formed thereon was bonded to the surface of the polarizing plate so that a pressure-sensitive adhesive polarizing plate was prepared.

The resulting pressure-sensitive adhesive optical films were evaluated as described below. The results are shown in Table 1.

(Strength of Adhesion to Glass)

The pressure-sensitive adhesive polarizing plate was cut into a 25 mm-wide sample. The sample was attached to a non-alkali glass plate (Corning 1737 manufactured by Corning Incorporated) and allowed to stand at 60° C. for 120 hours. The initial adhesive strength (N/25 mm) of the sample was then measured with a tensile tester under the conditions of 90° releasing and a pulling rate of 300 mm/minute in a room temperature atmosphere (25° C.).

The sample was also attached to a non-alkali glass plate and allowed to stand at 60° C. for 120 hours in the same manner as described above. Thereafter, using a pulsed electron beam radiation system Unitron 200/200 manufactured by Ushio Inc., the sample was irradiated with an electron beam in a nitrogen atmosphere and then measured for adhesive strength (N/25 mm) by the same method. In each example, the absorbed electron beam dose was 20 kGy. Concerning Example 1, a modified version (designated as Example 1') was also performed in which after irradiation at an absorbed electron beam dose of 5 kGy, the adhesive strength (N/25 mm) was measured.

(Resistance to Heat and Humidity)

The pressure-sensitive adhesive polarizing plate was cut into a 12 inch-size sample. The sample was attached to a non-alkali glass plate (Corning 1737 manufactured by Corning Incorporated) and subjected to an autoclave treatment (50° C.×0.5 MPa×15 minutes). The sample was then subjected to either a heat endurance test (standing at 90° C. for 500 hours) or a humidity endurance test (standing in a 90% RH atmosphere at 60° C. for 500 hours), and the occurrence of defects was examined and evaluated according to the following criteria:

o: No defect is observed.
Δ: Defects such as foaming or separation are sometimes observed.
x: Defects such as foaming or separation are observed.

TABLE 1

| | Coupling Agent Presence or Absence | Presence or Absence of Benzyl Ester | Absorbed Beam Dose (kGy) | Adhesive Strength (N/25 mm) Initial | Adhesive Strength (N/25 mm) After Electron Beam Irradiation | Durability Heat | Durability Humidity |
|---|---|---|---|---|---|---|---|
| Example 1 | Presence | Presence | 20 | 17 | 5 | o | o |
| Example 1' | Presence | Presence | 5 | 17 | 12 | o | o |
| Example 2 | Presence | Presence | 20 | 15 | 7 | o | o |
| Comparative Example 1 | Presence | Absence | 20 | 17 | 18 | o | o |
| Comparative Example 2 | Absence | Absence | 20 | 15 | 17 | o | X |

INDUSTRIAL APPLICABILITY

The optical pressure-sensitive adhesive of the invention and the pressure-sensitive adhesive optical film therewith are suitable for use in image displays such as liquid crystal displays, organic electroluminescence displays and plasma display panels.

The invention claimed is:

1. A method for separating an optical film bonded to an adherend with a pressure-sensitive adhesive layer interposed therebetween from the adherend, comprising:
   irradiating the pressure-sensitive adhesive layer with ionizing radiation; and
   then separating the optical film from the adherend, wherein the pressure-sensitive adhesive layer is formed using an optical pressure-sensitive adhesive, comprising:
   a base polymer having a functional group (F); and
   a coupling agent that has a benzyl ester group and is represented by

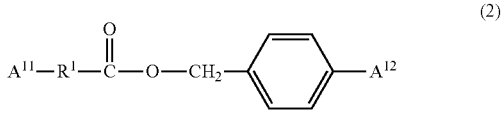

(2)

wherein $A^{11}$ is an alkoxysilyl group, a hydroxyl group, a carboxyl group, or an isocyanate group, $A^{12}$ is an epoxy group or a glycidyl group, and $R^1$ is an optionally substituted alkylene group of 1 to 12 carbon atoms or an optionally substituted phenylene group.

2. The method according to claim 1, wherein the base polymer is an acrylic polymer comprising an alkyl(meth)acrylate as a main monomer unit.

3. The method according to claim 1, wherein the functional group (F) of the base polymer is a hydroxyl group.

4. The method according to claim 1, wherein the optical pressure-sensitive adhesive comprises 100 parts by weight of the base polymer and 0.001 to 10 parts by weight of the coupling agent.

5. The method according to claim 1, wherein the optical pressure-sensitive adhesive further comprises a crosslinking agent.

* * * * *